(12) United States Patent
Jussaume

(10) Patent No.: US 7,000,346 B1
(45) Date of Patent: Feb. 21, 2006

(54) FISHING LURE

(76) Inventor: Raymond G. Jussaume, 16 Norwood Ave., Somerville, MA (US) 02145

( * ) Notice: Subject to any disclaimer, the term of this patent is extended or adjusted under 35 U.S.C. 154(b) by 0 days.

(21) Appl. No.: 10/865,331

(22) Filed: Jun. 11, 2004

(51) Int. Cl.
*A01K 85/00* (2006.01)
*A01K 85/16* (2006.01)

(52) U.S. Cl. .................. 43/42.48; 43/42.06; 43/42.32; 43/42.39; 43/42.45

(58) Field of Classification Search .............. 43/42.06, 43/42.32, 42.36, 42.39, 42.45, 42.48
See application file for complete search history.

(56) References Cited

U.S. PATENT DOCUMENTS

| | | | | | |
|---|---|---|---|---|---|
| 779,083 | A | * | 1/1905 | Jamison | 43/42.39 |
| 1,073,199 | A | * | 9/1913 | Wilt | 43/42.36 |
| 1,180,753 | A | * | 4/1916 | Zeigler | 43/42.32 |
| 1,193,077 | A | * | 8/1916 | Schoonmaker | 43/42.45 |
| 1,338,953 | A | * | 5/1920 | Odell | 43/42.48 |
| 1,394,313 | A | * | 10/1921 | Leeper | 43/42.39 |
| 1,489,207 | A | * | 4/1924 | Hall | 43/42.48 |
| 1,598,786 | A | * | 9/1926 | Romadke | 43/42.39 |
| 1,627,455 | A | * | 5/1927 | Peterson | 43/42.36 |
| 2,136,713 | A | * | 11/1938 | Schnabel | 43/42.32 |
| 2,204,552 | A | * | 6/1940 | Singleton | 43/42.36 |
| 2,292,592 | A | * | 8/1942 | Wright | 43/42.39 |
| 2,305,865 | A | * | 12/1942 | Goyings | 43/42.36 |
| 2,338,577 | A | * | 1/1944 | Divine | 43/42.48 |
| D140,296 | S | * | 2/1945 | Olson | 43/42.45 |
| D152,308 | S | * | 1/1949 | Wells | 43/42.48 |
| 2,476,388 | A | * | 7/1949 | Schafer | 43/42.06 |
| 2,480,580 | A | * | 8/1949 | Hopkins | 43/42.45 |
| D159,402 | S | * | 7/1950 | Algier | 43/42.48 |
| 2,542,429 | A | * | 2/1951 | Perry | 43/42.48 |
| D162,696 | S | * | 3/1951 | Stauffer | 43/42.48 |
| 2,558,436 | A | * | 6/1951 | Holt | 43/42.48 |
| 2,580,104 | A | * | 12/1951 | King | 43/42.48 |
| D169,816 | S | * | 6/1953 | Kirkman | 43/42.48 |
| 2,706,359 | A | * | 4/1955 | Beames | 43/42.36 |
| 2,709,317 | A | * | 5/1955 | Pease, Sr. | 43/42.06 |
| 2,716,831 | A | * | 9/1955 | Glass | 43/42.39 |
| 2,736,125 | A | * | 2/1956 | Perkins | 43/42.45 |
| 2,770,063 | A | * | 11/1956 | Martin | 43/42.39 |
| 2,776,518 | A | * | 1/1957 | Felmlee | 43/42.36 |
| 2,787,076 | A | * | 4/1957 | Kring | 43/42.36 |
| 2,820,314 | A | * | 1/1958 | Scott | 43/42.39 |
| 2,847,791 | A | * | 8/1958 | Simmons | 43/42.36 |
| 2,866,292 | A | * | 12/1958 | Busch | 43/42.48 |
| 2,871,609 | A | * | 2/1959 | Noches | 43/42.06 |
| 2,951,308 | A | * | 9/1960 | Kent | 43/42.36 |
| 2,981,028 | A | * | 4/1961 | Winhoven | 43/42.48 |
| 3,091,883 | A | * | 6/1963 | Hufford | 43/42.36 |

(Continued)

FOREIGN PATENT DOCUMENTS

| CA | 447101 | A | * | 3/1948 | 43/42.06 |
|---|---|---|---|---|---|

(Continued)

*Primary Examiner*—Darren W. Ark
(74) *Attorney, Agent, or Firm*—D. Michael Burns

(57) ABSTRACT

A fishing lure for use as a top water lure having a construction of negative buoyancy. The lure has an elongated weighted body resembling a squid with angled channels defined in the top and bottom surfaces of the body. Upon the lure being retrieved by an angler, water gushes through one of the channels and splashes over and about the leading end of the lure, causing the lure to "swim" over the water surface with the trailing end submersed in the water. This presents the appearance of a fleeting baitfish. By careful selection of colors and reflective strips the lure will have an appearance that is very visually stimulating to game fish.

11 Claims, 2 Drawing Sheets

U.S. PATENT DOCUMENTS

| | | | | |
|---|---|---|---|---|
| 3,370,375 | A | * | 2/1968 | Ottonello .................... 43/42.45 |
| 3,393,465 | A | * | 7/1968 | Powell ...................... 43/42.48 |
| 3,483,651 | A | * | 12/1969 | Borger ...................... 43/42.36 |
| 3,611,615 | A | * | 10/1971 | Field ........................ 43/42.36 |
| 3,708,903 | A | * | 1/1973 | Bercz et al. ............... 43/42.06 |
| 3,762,092 | A | * | 10/1973 | Bercz et al. ............... 43/42.35 |
| 3,769,739 | A | * | 11/1973 | Pitts ........................ 43/42.06 |
| 3,834,058 | A | * | 9/1974 | Gaunt ...................... 43/42.32 |
| 3,935,659 | A | * | 2/1976 | McCallum ................ 43/42.32 |
| 4,069,609 | A | | 1/1978 | Demy ...................... 43/42.06 |
| 4,102,075 | A | * | 7/1978 | Wagner et al. ............. 43/42.06 |
| 4,141,171 | A | * | 2/1979 | Muddiman ................ 43/42.39 |
| 4,155,192 | A | * | 5/1979 | Varaney .................... 43/42.32 |
| 4,199,888 | A | | 4/1980 | Barnes ...................... 43/42.39 |
| 4,414,772 | A | * | 11/1983 | Duncan .................... 43/42.36 |
| 4,536,987 | A | * | 8/1985 | Sanders et al. ............ 43/42.45 |
| 4,573,283 | A | * | 3/1986 | Pippert ..................... 43/42.39 |
| 4,616,440 | A | * | 10/1986 | Millroy .................... 43/42.06 |
| 4,862,631 | A | * | 9/1989 | Wilson et al. ............. 43/42.33 |
| 4,881,340 | A | | 11/1989 | Davis ........................ 42/42.06 |
| 5,077,930 | A | * | 1/1992 | Berry ....................... 43/42.32 |
| 5,097,620 | A | * | 3/1992 | Nietupski .................. 43/42.06 |
| 5,119,582 | A | * | 6/1992 | Dahl ........................ 43/42.36 |
| 5,381,623 | A | | 1/1995 | Crisp ....................... 43/42.43 |
| 5,477,634 | A | * | 12/1995 | Welcome .................. 43/42.48 |
| 5,564,220 | A | * | 10/1996 | Blicha ...................... 43/42.32 |
| 5,598,659 | A | * | 2/1997 | Vanorden .................. 43/42.39 |
| 5,787,633 | A | * | 8/1998 | Taylor ...................... 43/42.36 |
| 5,822,912 | A | | 10/1998 | Kato et al. ................ 43/42.22 |
| 6,018,902 | A | | 2/2000 | Gudermuth et al. ....... 43/42.32 |
| 6,035,574 | A | * | 3/2000 | Ware ........................ 43/42.06 |
| 6,085,404 | A | * | 7/2000 | Thomas .................... 43/42.39 |
| 6,173,522 | B1 | * | 1/2001 | Couch ...................... 43/42.32 |
| 6,182,391 | B1 | * | 2/2001 | Hubbard ................... 43/42.32 |
| 6,354,037 | B1 | * | 3/2002 | Coppola, Jr. .............. 43/42.06 |
| 6,557,293 | B1 | * | 5/2003 | Klapka ..................... 43/42.06 |
| 6,578,313 | B1 | | 6/2003 | Knol ........................ 43/42.47 |
| 6,609,326 | B1 | | 8/2003 | Salonen et al. ............ 43/42.22 |
| 6,684,557 | B1 | | 2/2004 | Yu ............................ 43/17.6 |
| 6,718,684 | B1 | | 4/2004 | Yong-Set .................. 43/42.39 |
| 2003/0074830 | A1 | * | 4/2003 | Goeke ...................... 43/42.39 |

FOREIGN PATENT DOCUMENTS

| | | | | | |
|---|---|---|---|---|---|
| CA | 525193 | A | * | 5/1956 | ............... 43/42.06 |
| CA | 871432 | A | * | 5/1971 | ............... 43/42.45 |
| GB | 9829 | A | * | 4/1903 | ............... 43/42.06 |
| JP | 2004-24081 | A | * | 1/2004 | |

* cited by examiner

FISHING LURE

FIELD OF THE INVENTION

The invention relates to fishing lures and more specifically to a top water lure with negative buoyancy.

BACKGROUND OF THE INVENTION

Sport fishing is enjoyed around the world. From fresh water to salt water, a wide variety of fish species exist. Fishermen employ a variety of equipment and tackle depending upon the water being fished, the time of day, the species of fish sought, personal choice, and many other factors. A fishing lure, sometimes referred to as an artificial lure, is frequently a part of such equipment and tackle.

Fishing lures are known in the art and are generally shaped to resemble the features of a fish. The lure is fitted with both an attachment to a fishing line and with a fish hook or the like. The lures are typically designed and decorated with the goal of replicating or mimicking the movement and appearance of a food source for the particular fish being sought. For example, such lure may take on the shape of a minnow, tadpole, frog, mouse, insect, salamander, another fish, or such other food source. The fisherman's hope is that by having a lure closely resembling or acting like a source of food, fish will be enticed into biting the lure.

Frequent problems occur with the use of such lures. The regular design shape does not aid accurate casting of the line, or improve the motion of the lure through the water. Lines often become snagged in underwater debris, reeds or seaweed and then remain entangled. The physical shape of the lure alone is often insufficient to deceive aquatic predators, who at different times are known to be more attracted to the vibratory movement of a fish in water.

In an effort to make the lure aesthetically realistic, a designer can use materials pigmented with the desired colors. For example, colored plastics or rubber may be used. In addition, a designer can paint or stain the external surface of the lure to achieve the desired color and marking characteristics. Decorative features such as scales, eyes, and fins may be painted onto the surface or otherwise added to the lure.

Lures can also be designed with features that make the lure realistic in a functional manner. Fins, diving planes, spinners, rattles and the like may be added in order to make the lure move and sound like a food source. Some lures may be specifically designed to operate on the water surface while others may function only when below.

Generally speaking, artificial lures are frequently deployed by casting the lure, while attached to fishing line, to a desired location within the water and then retrieving the lure using a reel. Anglers may use a variety of casting and retrieval techniques depending on a combination of personal preferences, the type of fish being sought, and the nature of the water being fished. The ability to precisely position the lure at or near particular structure, vegetation, or such other target is generally preferred and may be essential to hooking and landing a catch.

Aside from the skills of each individual angler, several factors about a lure can affect the angler's ability to precisely locate and retrieve a lure during casting. For example, the lure's overall shape, the weight of the lure, and the location of the point of attachment to the fishing line can affect the flight path of the lure during casting and the swim path of the lure during retrieval. Another factor is the lure's center of gravity. More specifically, the location of the center of gravity may affect the precision with which the lure can be cast as well as the movement of the lure as it is worked and retrieved by the angler. For certain lures, the most effective location for the center of gravity of a lure while casting may not be identical to the best location when the lure is being retrieved.

The primary goal is to develop a top water fishing lure with negative buoyancy, such that the angler may cast the lure great distances and the retrieval can be at a slower rate while providing the desired "swimming" action on the surface. This will allow the angler to reach actively feeding fish and give the angler the option to vary the retrieval rate in order to provoke strikes from the feeding fish. The lures should have various weights and colors to allow the angler to select the proper lure for the particular fishing conditions.

SUMMARY

In accordance with one aspect of the invention, a fishing lure is provided having a tapered, elongated body with a weight distribution creating negative buoyancy. The fishing lure is made primarily of plastic material, preferably acrylonitrile butadiene styrene, and has angled channels which taper from a leading end to a trailing end, a tapered channel in each of the top and bottom portions. A wire insert extends the length of the body and has a weight element integrally molded or cast to it, such that the weight element will be located towards the rear or trailing end for shifting the center of gravity rearward. Upon the angler casting the lure, it can then be retrieved by "reeling it in", and during the "reeling in" the lure is caused to come to the surface and "swim". The angler may increase the "swim" action by pumping the rod. While the lure is being retrieved by the "reeling in" and pumping of the fishing rod, the motion of water splashes in front of the lure, and this pumping action causes the lure to accelerate on the surface, wherein water is forced up the angled channel that is in contact with the water. The water is thus sprayed in front of the lure. The lure "swims" on the water surface, without rotation, due to the water that is forced into the active channel (submerged channel) towards the rear or trailing end of the lure. This water being forced through the active channel also gives the lure lift and stops the rotation. The position of the weight element in conjunction with the angled channels forces the lure to surface during slow retrieval speeds even though the lure has negative buoyancy. The weight element causes the trailing end of the lure to remain submersed in the water, and the flowing water forced through the submersed channel provides an appearance of a fleeing baitfish to promote strikes from game fish.

The present invention further provides for visually stimulating reflective or decorative strips to be disposed longitudinally along each channel to enhance the visual attraction of the lure to game fish. The channels provide a measure of protection to the strips.

The present invention also provides for the wire insert to protrude through opposing ends of the lure, and the wire insert having a loop on the leading end for connecting to a fishing/retrieval line and a loop on the trailing end for connecting a hook, whether it be a single, double or triple hook configuration.

The present invention provides lures in various colors which are known to attract different types of fish. While the size and weight of the lures will vary depending on the game fish sought, the lures generally weigh between about 0.75 to about 3 ounces.

The present invention provides for a method of making a fishing lure that involves a mold for forming plastic material about a weighted wire insert and in which the body of the lure will have defined in the top and bottom portions angled channels, one of which is in the water during retrieval and helps direct the flow of water towards the rear of the lure.

DETAILED DESCRIPTION OF THE INVENTION

Figure 1:
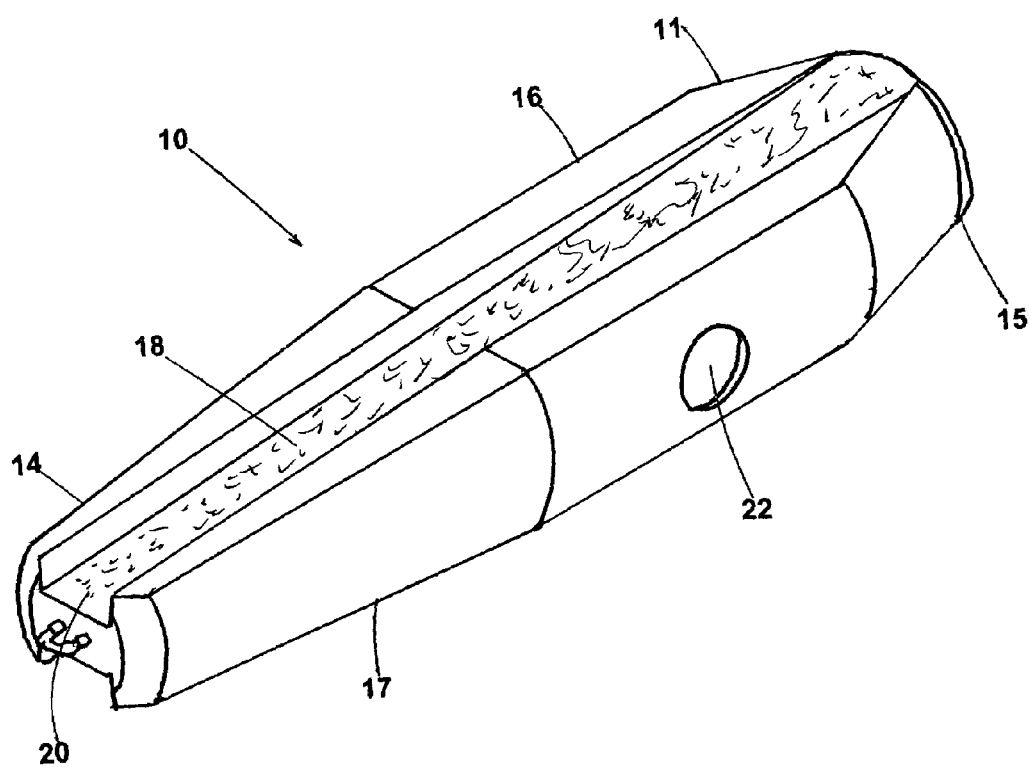
FIG. 1 is a pictorial view of a fishing lure of the present invention without the fishing line or the hook attached.
Figure 2:
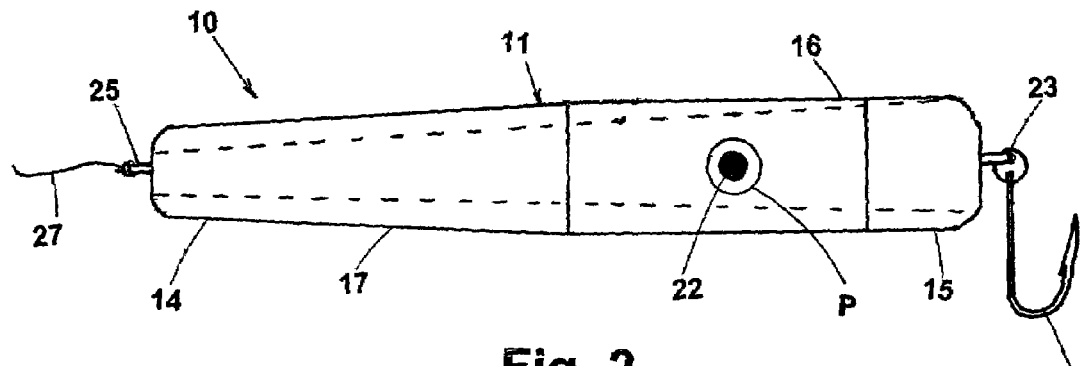
FIG. 2 is a side elevation view of the fishing lure of the invention thereof.
Figure 3:
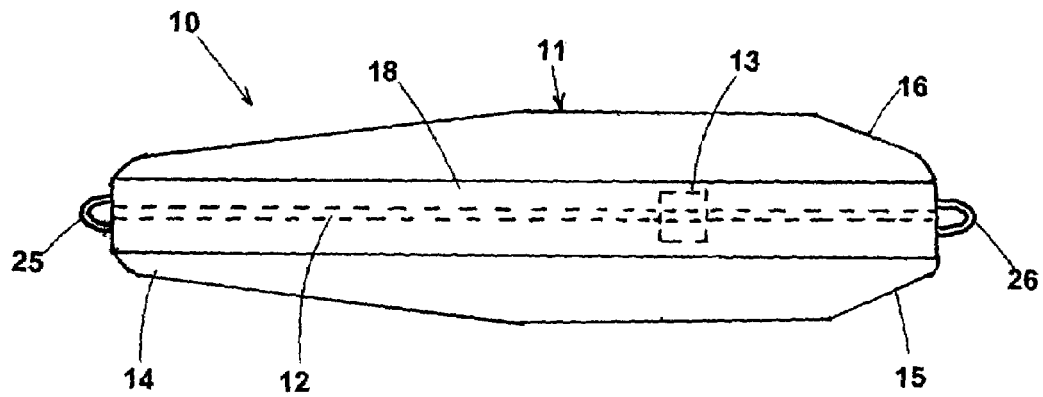
FIG. 3 is a top plan view of the fishing lure of FIG. 1.
Figure 4:
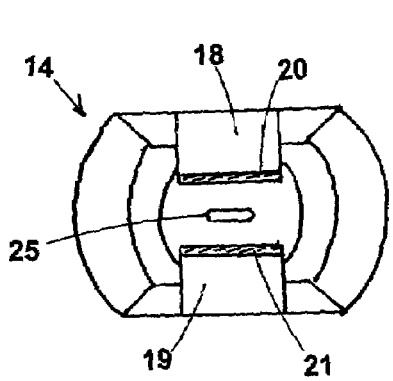
FIG. 4 is a leading end view of FIG. 1.
Figure 5:
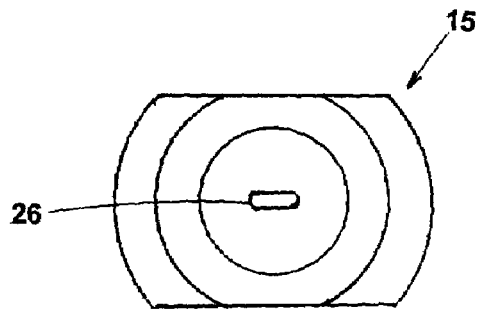
FIG. 5 is a trailing end view of FIG. 1.

The fishing lure of the present invention is shown in FIGS. 1 to 5, and is represented by the reference 10. The lure 10 of the present invention is a top water, fishing lure with negative buoyancy. The lure 10 is designed and constructed such that the angler may cast the lure 10 great distances and the retrieval will be at slower rates than conventional negative buoyant lures. This allows the angler to reach actively feeding fish and give the angler the option to vary the retrieval rate in order to provoke strikes from the feeding fish. The lure 10 can be manufactured in various weights and colors to allow the angler to select the proper lure for the particular fishing conditions. The lure 10 has been designed to resemble a squid with its tapered construction and large eye positioned toward the trailing end of the lure 10.

The lure 10 includes an elongated generally tapered body 11 having a leading end 14 and a spaced apart trailing end 15. While many suitable materials may be used, the lure of the present invention is preferably made from a plastic material such as acrylonitrile butadiene styrene. Extending through the body 11 is a wire insert 12 which has a weight element 13 integral to it. The weight element has a density greater than the plastic body. The body 11 also has angled channels, a first angled channel 18 and a second angled channel 19 extending along opposing top portion 16 and bottom portion 17 of the body 11 respectively. Only one of the angled channels, either the first channel 18, or the second channel 19, is submersed in the water during retrieval.

The weight element 13 is positioned towards the trailing end 15 of the body 11 for three critical purposes. First, it allows the angler to cast the lure 10 a relatively long distance, since the center of gravity of the lure 10 is positioned towards the trailing end 15. Secondly, the position of the weight element 13 combined with the angled channels 18 and 19 forces the lure 10 to surface during slow retrieval rates even though the lure 10 has negative buoyancy. And thirdly, the position of the weight element 13 significantly impacts the action of the lure 10. During retrieval, the lure 10 surfaces and then rides in the water with the trailing end 15 still submersed in the water because of the rearward position of the center of gravity. This action causes water to move up the angled channel that is submersed, either it be the first 18 or second channel 19, and then to be sprayed over the leading end 14 of the lure 10. This movement of the flowing water over the surface of the lure 10 provides an appearance of a fleeing baitfish and therefore promotes strikes from game fish.

The angled channels 18 and 19 cause the lure 10 to "swim" on the surface without rotation. This is an important design concept because rotation causes the line to twist which ruins the fishing line. The angled channels 18 and 19 also have four distinct functions. First, in coordination with the weight element 13, the lure 10 is forced to surface during slow retrieval rates even though the lure 10 has negative buoyancy. Secondly, as mentioned above, surface commotion caused by water moving up one of the angled channels 18 and 19 and spraying over the leading end 14 of the lure 10 gives the lure 10 the necessary appearance of a fleeing baitfish. Thirdly, the angled channel provides the lure 10 with greater surface area being in contact with the water. This significantly slows the sink rate as compared to other negative buoyant lures and round bottoms or steep "V" shaped bottoms. This helps the angler to control the rate of retrieval depending of the feeding activity of the game fish. And fourthly, the angled channels 18 and 19 are protective sites for visually stimulating decorative and/or reflective tapes 20 and 21 respectively, which are applied to surfaces along their longitudinal axis to provide a measure of increased visual attraction by game fish. The angled channels 18 and 19 protect the reflective tape product from damage caused by fish teeth, beach sand/gravel and other typical hazards of tape finishes. The angled channels 18 and 19 also promote a "swim" movement, wherein the lure 10 "swims" on the surface without any rotation, which is one of the main improvements of the present invention. In many lure designs the rotation of the lure can cause the fishing line to twist, which may ruin the line and thus bring a premature end to a fishing trip.

The tapered construction of the leading end 14 and trailing end 15 provides an aerodynamic design to the lure 10 that assists in distance casting, and also in conjunction with the large rearward eyes 22, one on each side 23 and 24 of the body 11, gives the impression of a squid, which is a food source for game fish. It is to be appreciated that the lure 10 of the present invention may take the shape of other game fish lures within the scope of the invention.

The wire insert 12 is preferably formed from stainless steel wire, preferably about 51 mil 300 series stainless steel wire, although those skilled in the art may provide other suitable materials. The metallic weight element 13 is preferably lead and is integrally molded or cast onto the wire 12. The wire insert 12 with the weight element 13 is placed into a mold of a plastic molding machine. Molten plastic is forced into the mold and the entire assembly remains in the mold until the plastic begins to solidify. The molded lure 10 is then ejected from the mold and cured by water submersion. The lure body 11 has openings for the eyes 22, one positioned on each side of the body 11. The position of the eyes 22 approximates the location of the weight element 13, which is designated by P in FIG. 2 of the drawings. The decorative or reflective tape 22 is then applied in the channels 18 and 19. The leading end 14 and trailing end 15 both have protruding from their surfaces ordinary attachment loops, a leading end loop 25 and a trailing end loop 26. A fishing line 27 is attached to the loop 25 at the leading end 14. A split ring 23 is subsequently attached to the trailing end loop 25 of the wire insert 13, and a hook 24 (with or without dressing) is attached to the split ring 23. Although the hook 24 may be of a single, double, or treble hook style, for clarity only a single hook is shown in the drawings. On certain occasions it is desirable to remove the hook 24 so that the lure 10 may be used as a "teaser" to bring fish closer to the angler. This technique is popular in fly fishing when the angler can not cast the fly as great a distance as the lure 10 but wants the experience of catching game fish on fly tackle.

"Dressing" (not shown) may be applied to any of the above mentioned hook styles. Dressing can be in the form of buck tail (natural or synthetic), feathers, tube tail (piece of tubing applied to the hook), grub tail (rubber type bait usually associated with a jig), or a squid skirt (usually made of man made materials such as vinyl, rubber or plastic). The dressing gives added attraction for game fish and makes the Surface Tension Lure 10 of the present invention to assume a squid-like appearance.

The present invention is an excellent lure for "surf casting", wherein the angler casts and retrieves the lure 10 from a shore position. The lure 10 may also be used from a boat in a cast/retrieve method or are trolled behind a boat. Trolling allows the angler to cover more fishing area when searching for schools of fish. When fish can be located, the boat can be stopped and a cast/retrieve method can then be utilized.

The lure 10, as stated above, may be made in a variety of sizes and colors. Preferable sizes with anglers are lures weighing ¾, 1¼, 2, and 3 ounces. Although sizes may vary upon the fish sought, the basic concept of the lure 10 is the same regardless of the dimensions of any one particular sized lure.

From the foregoing, it will be seen that this invention is one adapted to obtain all the ends and objects herein set forth, together with other advantages which are inherent to the structure.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A fishing lure comprising:
    an elongated body having a weight distribution creating a negative buoyancy;
    the body having a tapered shape with a leading end and a spaced apart trailing end;
    the body having a top portion and a bottom portion, a first angled channel and a second angled channel respectively defined therein;
    a reflective flat planar strip disposed along a longitudinal axis of each angled channel for enhancing the visual attraction of the lure to game fish;
    a wire insert extending the length of the body, the wire insert having opposing ends, one end protruding from the leading end of the lure and the other end protruding from the trailing end of the lure;
    a weight element integrally molded to the wire insert for shifting rearward the center of gravity of the lure;
    the wire insert having means at the leading end for attaching to a fishing line, and means at the trailing end for attaching to a fish hook,
    wherein in the retrieval of the lure, the lure is caused to swim on a water surface with the trailing end submersed in the water and water being forced up one of the angled channels over the leading end to thereby create the appearance of a fleeing baitfish to therefore promote strikes from game fish.

2. The lure according to claim 1, wherein the lure is formed from plastic.

3. The lure according to claim 2, wherein the plastic is an acrylonitrile butadiene styrene.

4. The lure according to claim 1, wherein the means for attaching a fishing line is a leading end loop.

5. The lure according to claim 1, wherein the hook attaching means is a trailing end loop.

6. The lure according to claim 1, wherein the body is configured to simulate bait that has a squid-like appearance.

7. The lure according to claim 1, wherein the body comprises various colors to visually attract fish.

8. The lure according to claim 1, wherein the lure ranges in weight from about 0.75 ounce to about 3 ounces.

9. The lure according to claim 1, wherein the wire insert is formed from stainless steel.

10. The lure according to claim 1, wherein the density of the weight element is greater than the density of the body.

11. The lure according to claim 1, wherein the weight element is lead.

* * * * *